United States Patent
Cavieres et al.

(10) Patent No.: US 9,705,447 B2
(45) Date of Patent: *Jul. 11, 2017

(54) MOUNTING CLIPS FOR PANEL INSTALLATION

(71) Applicant: Georgia Tech Research Corporation, Atlanta, GA (US)

(72) Inventors: Andrés Cavieres, Atlanta, GA (US); Tristan Al-Haddad, Clarkston, GA (US); Joseph Goodman, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 607 days.

This patent is subject to a terminal disclaimer.

(21) Appl. No.: 14/073,767

(22) Filed: Nov. 6, 2013

(65) Prior Publication Data

US 2014/0294493 A1 Oct. 2, 2014

Related U.S. Application Data

(60) Provisional application No. 61/807,416, filed on Apr. 2, 2013, provisional application No. 61/806,203, filed on Mar. 28, 2013.

(51) Int. Cl.

| *F16B 2/24* | (2006.01) |
|---|---|
| *H02S 30/10* | (2014.01) |
| *F16B 5/12* | (2006.01) |
| *F16B 5/06* | (2006.01) |
| *F24J 2/52* | (2006.01) |

(52) U.S. Cl.
CPC .............. *H02S 30/10* (2014.12); *F16B 2/241* (2013.01); *F16B 5/0685* (2013.01); *F16B 5/125* (2013.01); *F24J 2/5254* (2013.01); *F24J 2/5233* (2013.01); *F24J 2/5237* (2013.01);
(Continued)

(58) Field of Classification Search
CPC ........ F24J 2/5254; F24J 2/5256; F24J 2/5252; F24J 2/5233; F24J 2/5237; F24J 2002/5292; F16B 2/241; F16B 5/125; F16B 5/0685; Y02E 10/47; H02D 30/10; Y10T 403/7176; Y10T 24/44017
See application file for complete search history.

(56) References Cited

U.S. PATENT DOCUMENTS

| 5,823,495 A | 10/1998 | Joss et al. |
|---|---|---|
| 7,285,006 B1 | 10/2007 | Daily |

(Continued)

FOREIGN PATENT DOCUMENTS

DE 102012208480 B3 * 5/2013 ............. F24J 2/5233

OTHER PUBLICATIONS

International Search Report in PCT Application No. PCT/US2014/032179; mailed Aug. 22, 2014.

*Primary Examiner* — Matthieu F Setliff
(74) *Attorney, Agent, or Firm* — Morris, Manning & Martin, LLP; Daniel E. Sineway, Esq.

(57) ABSTRACT

A photovoltaic panel mounting clip comprising a base, central indexing tabs, flanges, lateral indexing tabs, and vertical indexing tabs. The mounting clip removably attaches one or more panels to a beam or the like structure, both mechanically and electrically. It provides secure locking of the panels in all directions, while providing guidance in all directions for accurate installation of the panels to the beam or the like structure.

4 Claims, 14 Drawing Sheets

(52) U.S. Cl.
CPC ........ *F24J 2002/5292* (2013.01); *Y02E 10/47* (2013.01); *Y10T 403/602* (2015.01)

(56) References Cited

U.S. PATENT DOCUMENTS

| | | | |
|---|---|---|---|
| 7,351,023 B2* | 4/2008 | Scroggie | ............... F16B 5/123 24/297 |
| 8,181,926 B2 | 5/2012 | Magno, Jr. et al. | |
| 8,424,255 B2 | 4/2013 | Lenox et al. | |
| 8,590,223 B2 | 11/2013 | Kilgore et al. | |
| 8,713,881 B2 | 5/2014 | Dupont et al. | |
| 8,875,453 B2 | 11/2014 | Kanczuzewski et al. | |
| 2006/0168773 A1 | 8/2006 | Smith et al. | |
| 2007/0257158 A1 | 11/2007 | Caveney et al. | |
| 2010/0146747 A1 | 6/2010 | Reznar et al. | |
| 2010/0276558 A1 | 11/2010 | Faust et al. | |
| 2012/0097816 A1 | 4/2012 | Tamm et al. | |
| 2012/0201601 A1 | 8/2012 | Rizzo | |
| 2014/0003861 A1 | 1/2014 | Cheung et al. | |
| 2014/0008312 A1 | 1/2014 | Durney et al. | |

* cited by examiner

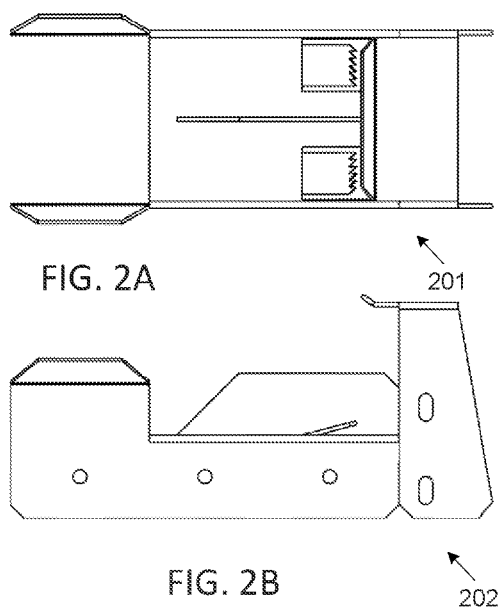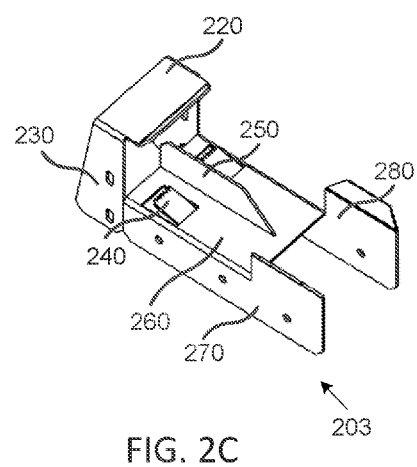

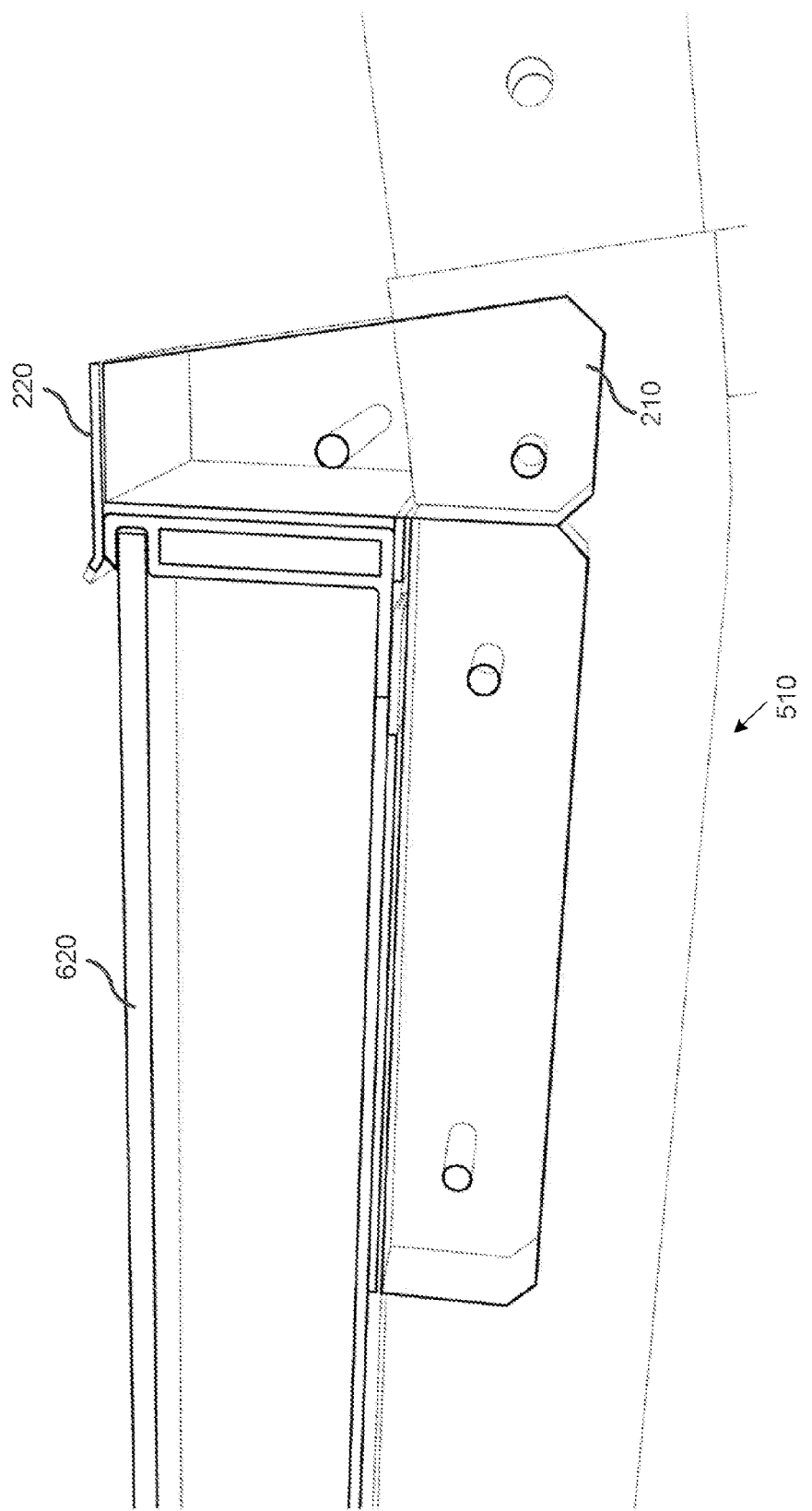

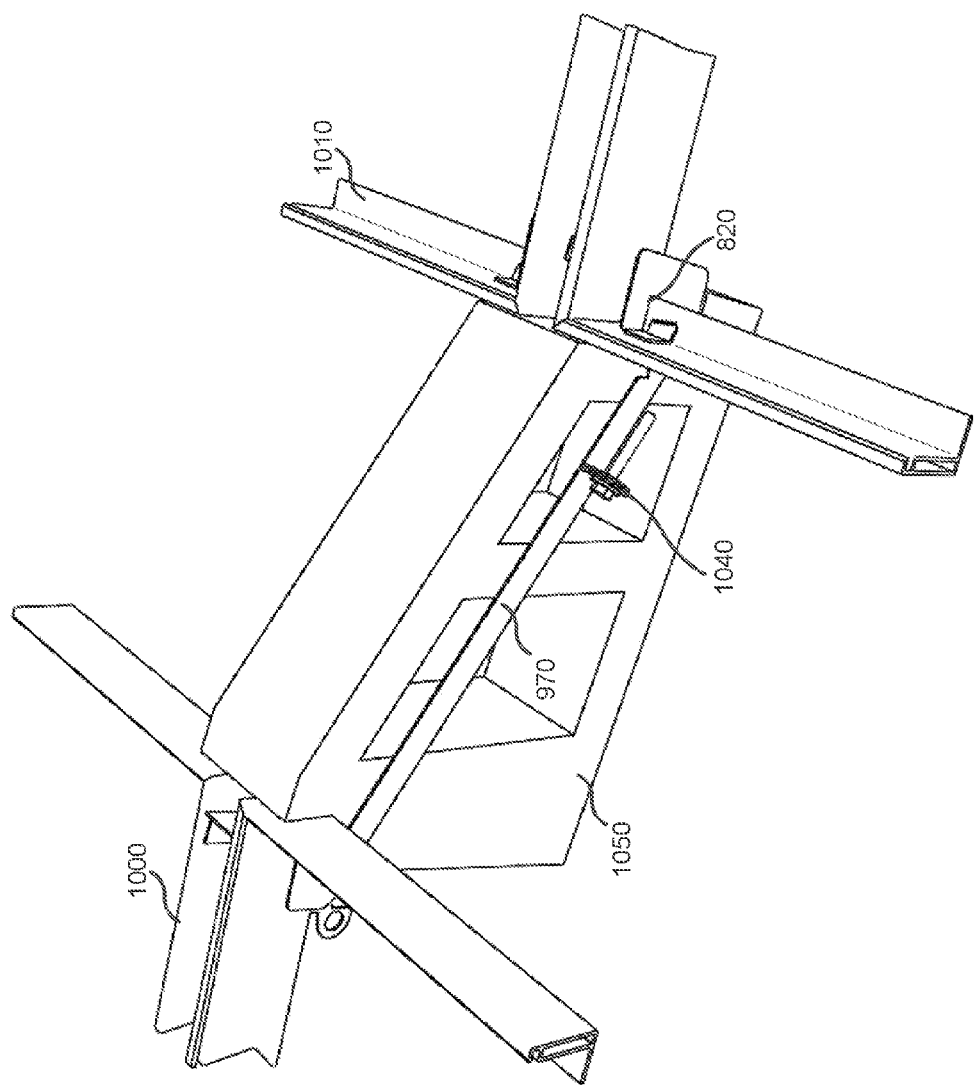

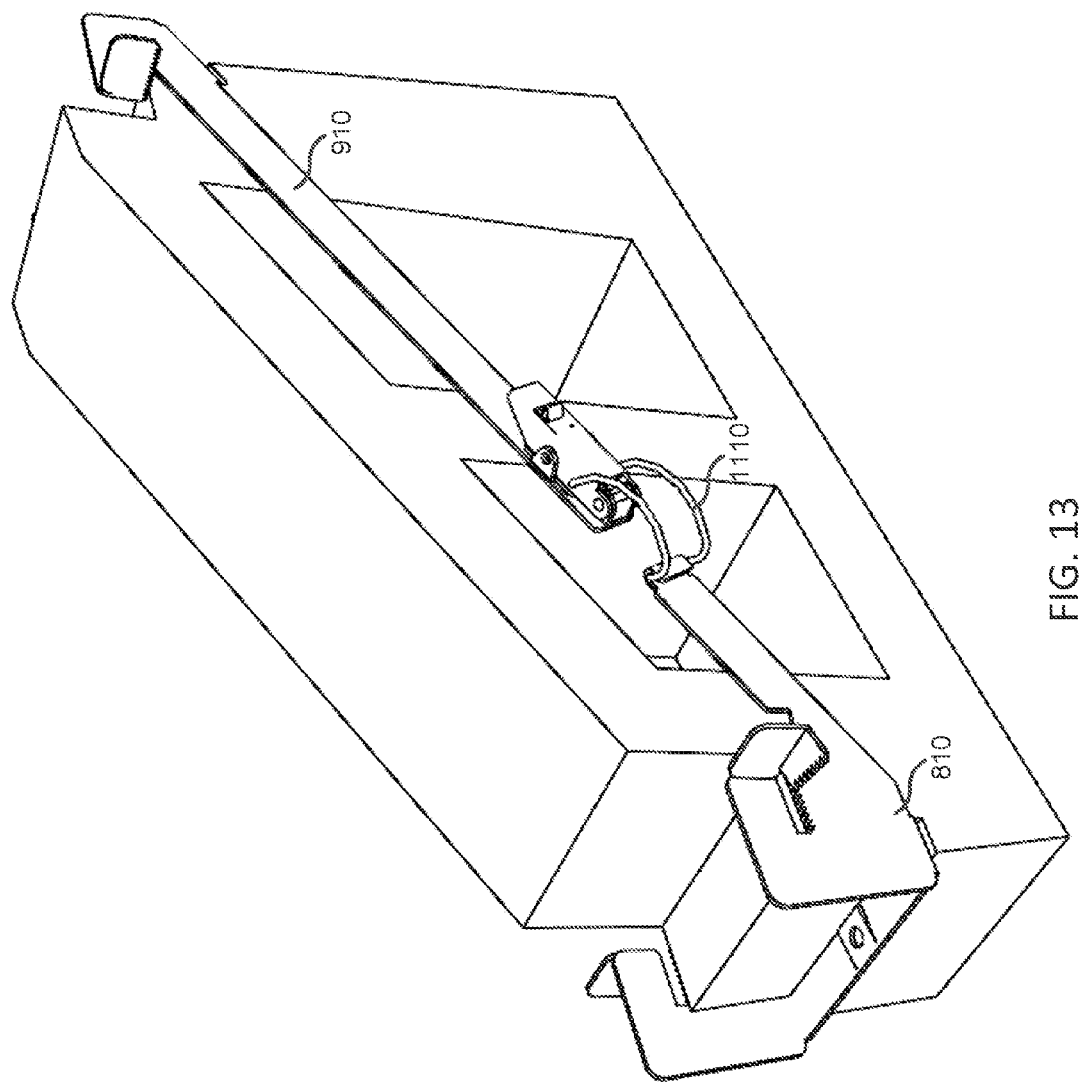

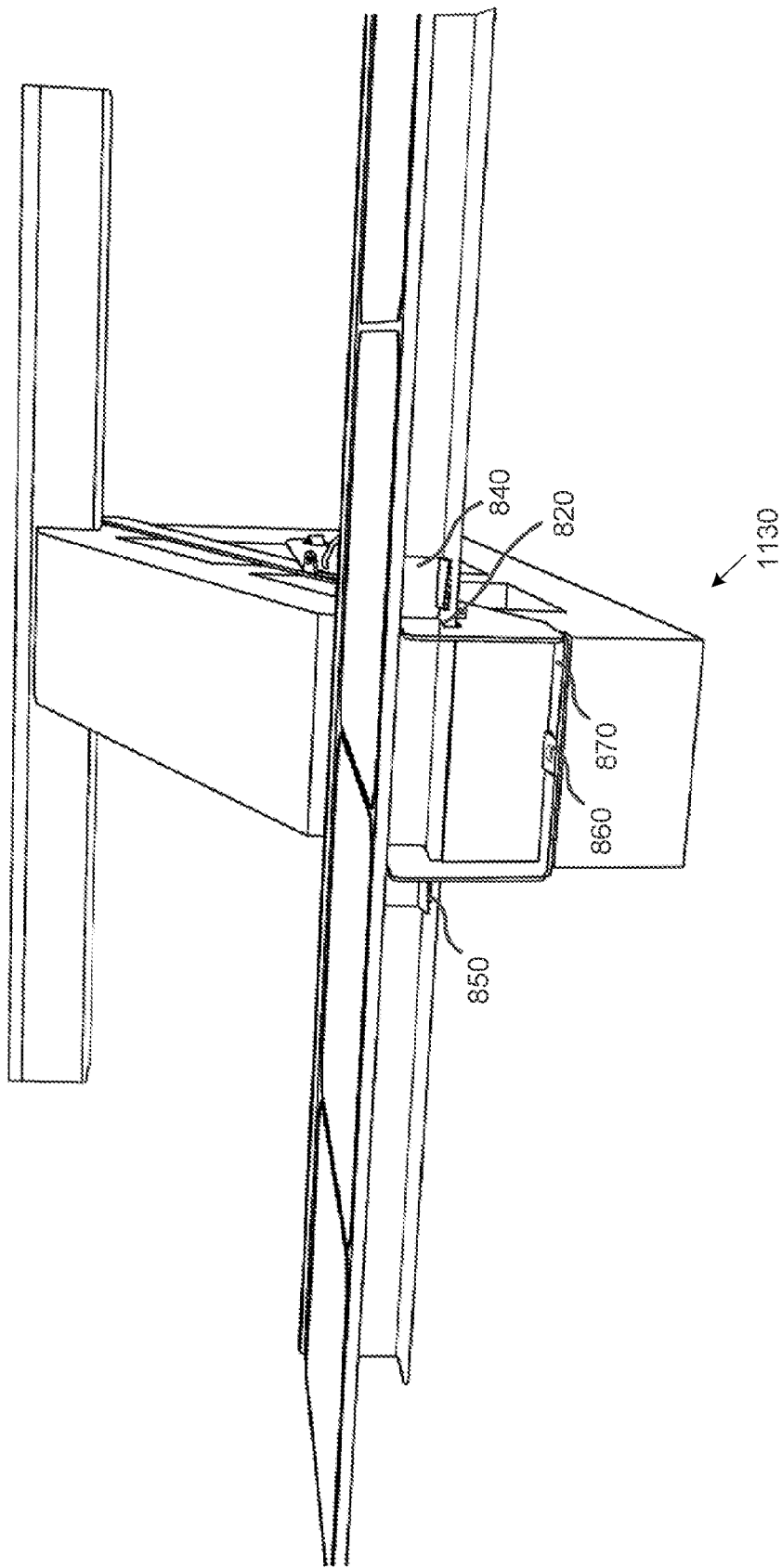

MOUNTING CLIPS FOR PANEL INSTALLATION

CROSS-REFERENCE TO RELATED APPLICATIONS

This application is a non-provisional application which claims the benefit to Provisional Application No. 61/807,416 filed on Apr. 2, 2013 and Provisional Application No. 61/806,203 filed on Mar. 28, 2013.

STATEMENT REGARDING FEDERALLY SPONSORED RESEARCH

This invention was made with Government support under Grant Number DE-EE0005441, awarded by The Department of Energy. The Government has certain rights in the invention.

BACKGROUND

Field of the Invention

The present invention relates generally to mounting means for photovoltaic panel installation systems. More particularly, the present invention relates to mounting clips for photovoltaic panel installation on a mounting structure that provides easy installation and electrical bonding.

Description of Related Art

Photovoltaic panels are an environmentally friendly solution to generating electricity. However, they are an expensive solution, not only because of the cost of the photovoltaic panels themselves, but also because of the cost of installation of the photovoltaic panels. Typically, installation of photovoltaic panels requires highly trained installers and many hours of labor to properly align the panels and install them securely and accurately.

The installation of a photovoltaic panel often requires mounting means to securely attach the photovoltaic panel to a secure structure. Such mounting means not only needs to be secure and stable, but also requires electrical bonding and simple installation procedure. The mounting means commercially available are difficult to install and require many different parts and tools to assemble the photovoltaic array. In addition, mounting means usually do not provide both mechanical fastening and electrical bonding of the photovoltaic panel.

Therefore, what is needed is a photovoltaic panel mounting means which enables both mechanical and electrical bonding when installed, and provides for an easy installation process. This would result in a reduction of time and skill necessary to install photovoltaic panels on a mounting structure.

SUMMARY

The subject matter of this application may involve, in some cases, interrelated products, alternative solutions to a particular problem, and/or a plurality of different uses of a single system or article.

In one aspect, a first mounting clip removably attaches one or more panels to a rail, both mechanically and electrically. The first mounting clip comprises a base having a leading edge and a trailing edge where the base is sized to fit on top of the rail. A plurality of locking clips is formed, extending upwardly away from the base towards the leading edge. Each of the plurality of locking clips provides upward force with regards to the base when pushed downwardly towards the base, acting like a spring. A central indexing tab is formed from the base uprightly and dividing the base in half lengthwise. The central indexing tab provides a z-direction guide for installing each of the one or more panels. At least two flanges are formed at each side of the base and angled downwardly away from the base. Each of the two flanges is configured to removably attach the base along each side of the rail. Further, a pair of lateral indexing tabs is formed uprightly along each side of the base where each of the pair of lateral indexing tabs is positioned and sized to receive one of the one or more panels in place. Each of the pair of lateral indexing tab further comprises a sliding slot defined between each of the pair of lateral indexing tab and the base having an opening end at the trailing edge. A vertical indexing tab is formed at each end of the pair of lateral indexing tabs, extending outwardly with respect to each of the lateral indexing tab at a perpendicular angle while the vertical indexing tab provides an x-direction guide for installing each of the one or more panels.

In another aspect, second mounting clip comprises a base where a plurality of spring bonding tabs is formed. Each of the plurality of spring bonding tabs extends at an angle upwardly away from the base and rises towards the trailing edge. A top flange is formed above and parallel to the base at the trailing edge where the top flange prevents movement of or more panels in y-direction. A side flange is formed side of the base and angled downwardly away from the central indexing tab is formed from the base uprightly, dividing the base in half lengthwise. The central indexing tab provides a z-direction guide for installing the panels. Finally, a vertical indexing tab is formed at each side of the base at the leading edge. The vertical indexing tab provides a z-direction guide for installing each of the one or more panels in conjunction with the central indexing tab.

In yet another aspect, similar embodiments and variations of an all direction-guided mounting means are further disclosed designed to fit a different configuration of a mounting structure. The mounting structure may include beams, rails, blocks, or the like.

BRIEF DESCRIPTION OF THE DRAWINGS

FIG. 2 (consisting of FIGS. 2A, 2B, and 2C) provides an embodiment of a second mounting clip.

FIG. 9 provides a lengthwise cross section view of the removably bonded second mounting clip.

FIG. 12 provides an embodiment of the first lateral clip and the second lateral clip bonded to the ballast.

FIG. 13 provides an embodiment of the first lateral clip and the second lateral clip mechanically fastened together.

FIG. 14 provides another embodiment of the first lateral clip mounting one of the photovoltaic panels to the ballast.

DETAILED DESCRIPTION

Figure 1A:
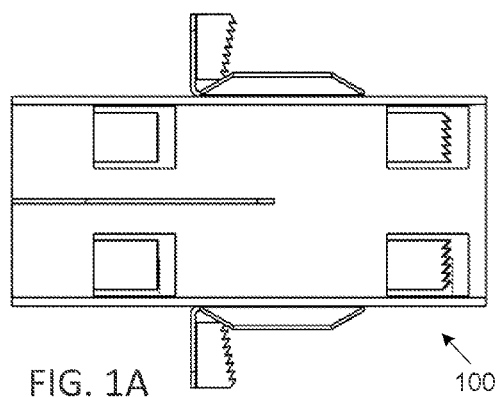
FIG. 1 (consisting of FIGS. 1A, 1B, and 1C) provides an embodiment of a first mounting clip.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Photovoltaic panels are commonly installed suspending away from an installation surface. Generally, a structure is placed under the photovoltaic panels providing a mounting surface. It requires an accurate measurement in order to mount the photovoltaic panels at the right mounting points, which relates to increase in time and cost of installation. Currently, photovoltaic panel mounting means have several shortcomings, such as, lack of electrical bonding of the photovoltaic panels to the mounting surface and highly complex installation process due to large number of tool requirements.

The mounting clips for photovoltaic installation on a rail described herein provide both mechanical and electrical bonding of the photovoltaic panels to the mounting surface. In addition, the disclosed invention provides prevention of movements in x, y, and z directions using a locking clip mechanism. The photovoltaic mounting means described herein simplifies installation process of photovoltaic panels by providing a reference guide and indexing mechanisms for easy and quick alignment and squaring of photovoltaic panels. Moreover, the locking mechanism of the disclosed invention allows installation of photovoltaic panels on unleveled installation surfaces where the angle of the installation surface ranges between 0 and 90 degrees, thereby providing flexibility during the installation process.

The mounting clips for panel installation, disclosed herein, and its components may be constructed of any material that may withstand and support the weight of the photovoltaic panels in all weather conditions without substantial damage or deformation. Materials of which may include, but not limited to, metals such as steel, stainless steel, aluminum, titanium, and the like; ceramic composites, composite reinforced metals, plastic and the like. In one embodiment, the photovoltaic racking system and its components may be constructed of a conductive metal to provide a grounding path.

Generally, the disclosed invention concerns a mounting clip for photovoltaic panel installation on a mounting surface. The disclosed invention teaches mounting clips formed to bond a plurality of photovoltaic panels on to a plurality of rails, both electrically and mechanically. A plurality of mounting clips are attached on top of the rails providing a mounting means that slidably locks in one or more photovoltaic panels. The disclosed invention also teaches a mounting means configured to wrap around a circumference of ballast. The disclosed invention is designed to work with different types and dimensions of photovoltaic panels and supports installation of panels in portrait and landscape configurations.

Figure 1B:
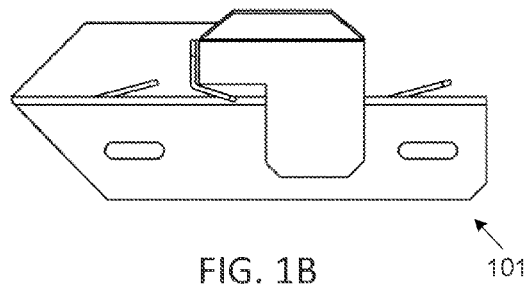
Figure 1C:
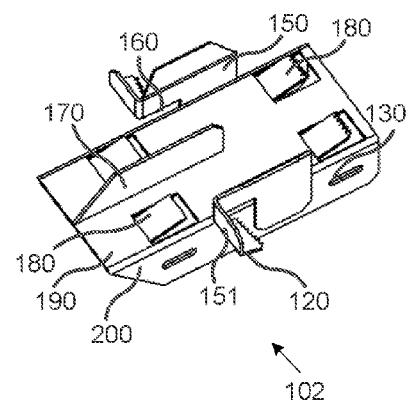

Now turning to FIG. 1 (consisting of FIGS. 1A, 1B, and 1C), an embodiment of a first mounting clip is shown. The first mounting clip 102 may be removably attaching one or more panels to a rail where the first mounting clip 102 may be constructed of a sheet of material. The first mounting clip may comprise of a base 190, a central indexing tab 170, at least two flanges 200, a pair of lateral indexing tabs 150, a sliding slot 160, a vertical indexing tab 151, and a plurality of locking clips 180.

In one embodiment, the base 190 may have a leading edge and a trailing edge. In FIG. 1, the leading edge is on the right of the first mounting clip 102 and the trailing edge is on the left of the first mounting clip 103. The base 190 may be sized to fit on top of the rail and a plurality of locking clips 180 may be formed thereon, each of the plurality of locking clips 180 may extend upwardly and away from the base 190 towards the leading edge. The plurality of locking clips 180 may be of a spring material where upward force is generated when pushed downwardly towards the base 190.

In another embodiment, a central indexing tab 170 may be formed from the base 190 uprightly, dividing the base in half lengthwise. The central indexing tab 170 may be configured to provide a z-direction guide for installing each of the one or more panels. The central indexing tab 170 may retain movement of the one or more panels in z-direction.

In a further embodiment, at least two flanges 200 may be formed at each side of the base 190 at an angle downwardly and away from the base 190. Each of the two flanges 100 may be configured to removably attach to each side of the rail, providing mechanical bonding of the first mounting clip 102 to the rail.

\In yet another embodiment, a pair of lateral indexing tabs 150 may be formed uprightly along the each side of the base, positioned and sized to receive one of the one or more panels in place. Each of the pair of lateral indexing tabs 150 may further form a sliding slot 160, where the sliding slot 160 may be defined between each of the pair of lateral indexing tab 150 and the base 190. The sliding slot 160 may be configured to receive one of the one or more panels at an opening end located at the trailing edge.

In a further embodiment, a vertical indexing tab 151 may be extended at each end of the pair of lateral indexing tabs 150, extending outwardly with respect to each of the lateral indexing tab 150 at a perpendicular angle. The vertical indexing tab 151 may provide a x-direction guide for installing each of the one or more panels, retaining movement of each of the one or more panels in x-direction. The vertical indexing tab 151 may further extend downwardly towards the base 190 and inwardly towards the leading edge at an angle, forming a spring bonding tab 120. The spring bonding tab 120 may have a toothed edge where the toothed edge may make contact with the one or more panels when installed.

In yet another embodiment, some of the plurality of locking clips 180 may have a toothed edge where contact is made with the one or more panels, providing electrical bonding.

The panels contemplated herein may be any type of panels which requires electrical bonding to a mounting means including, but not limited to, a photovoltaic panel or the like. The rail contemplated herein may be angled at any angle ranging between 0 degrees to 90 degrees with respect to a ground surface.

Now turning to FIG. 2 (consisting of FIGS. 2A, 2B, and 2C), an embodiment of a second mounting clip is shown. The second mounting clip 203 may removably attach one or more panels to a rail. The second mounting clip may comprise a base 260, a top flange 220, a side flange 270, a central indexing tab 250, a vertical indexing tab 280, and a plurality of spring boding tabs 240.

In one embodiment, the second mounting clip 203 may have a leading edge and a trailing edge, where the left of the FIG. 2 is the trailing edge and the right of the FIG. 2 is the leading edge. The base 260 may be configured to fit on top of the rail.

In another embodiment, the plurality of spring bonding tabs 240 may be formed from the plane thereof at an angle upwardly away from the base and rising towards the trailing edge. The plurality of spring bonding tabs 240 may retain movement of the one or more panels in x-direction when installed.

In another embodiment, the top flange 220 may be formed above and parallel to the base 260 at the trailing edge. The top flange 220 may be formed at a height configured to receive the one or more panels. The top flange 220 may be contiguously connected to the base 260. The top flange 220 may prevents movement of the one or more panels in a y-direction.

In yet another embodiment, the side flange 270 may be formed at each side of the base 260 and angled downwardly away from the base 260. Each of the two side flanges 270 may be configured to fit along the rail providing connecting means to removably attach the second mounting clip 203 along each side of the rail.

In a further embodiment, the central indexing tab 250 may be formed from the base uprightly, dividing the base in half lengthwise. The central indexing tab 250 may provide a z-direction guide for installing each of the one or more panels.

In a still further embodiment, the vertical indexing tab 280 may be formed at each side of the base 260 at the leading edge. The vertical indexing tab 280 may be formed uprightly and sized to receive the one or more panels, providing a z-direction guide for installing each of the one or more panels. The vertical indexing tab 280 may work with the central indexing tab 250 to prevent movement of the one or more panels in a z-direction when installed.

In yet another embodiment, some of the plurality of spring bonding tabs 240 may have a toothed edge where contact is made with the one or more panels, providing electrical bonding.

Figure 3:
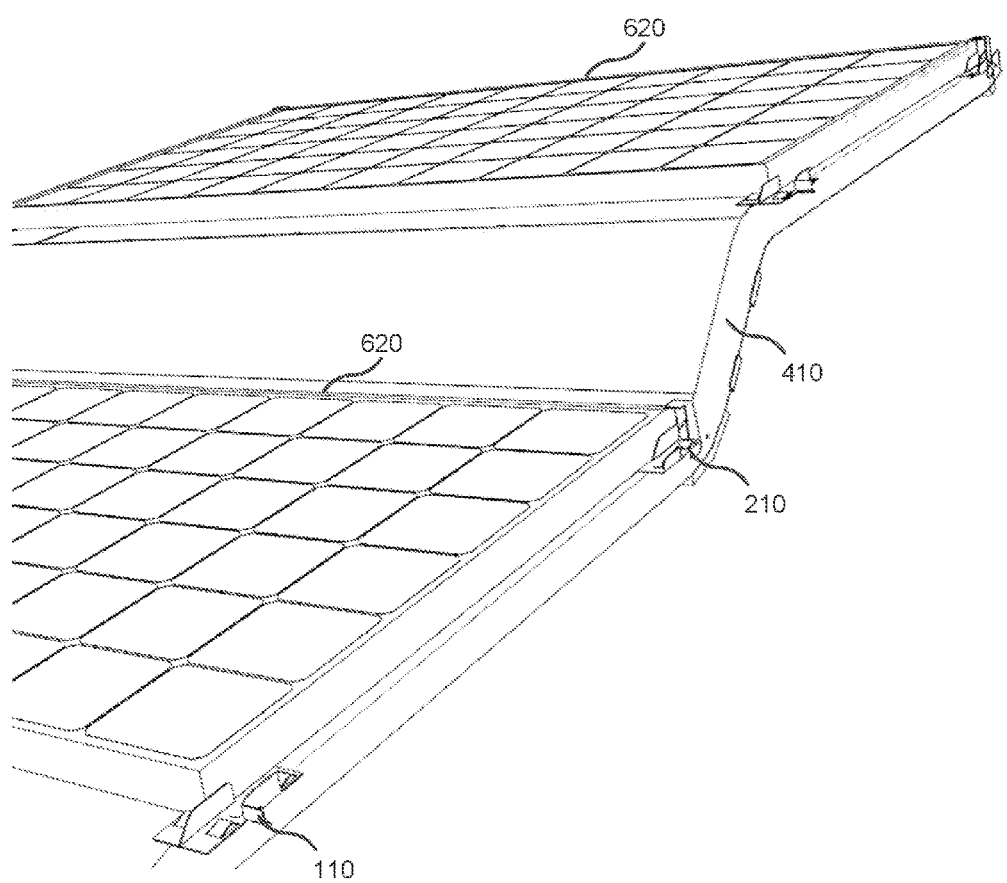
FIG. 3 provides the first mounting clip and the second mounting clip utilized to mount a plurality of photovoltaic panels to a bent beam structure.

FIG. 3 illustrates the first mounting clip and the second mounting clip utilized to mount a plurality of photovoltaic panels to a bent beam structure. Each of the photovoltaic panels 620 may be locked in to place on top of the bent beam structure 410 by the first mounting clip 110 and the second mounting clip 210.

Figure 4:
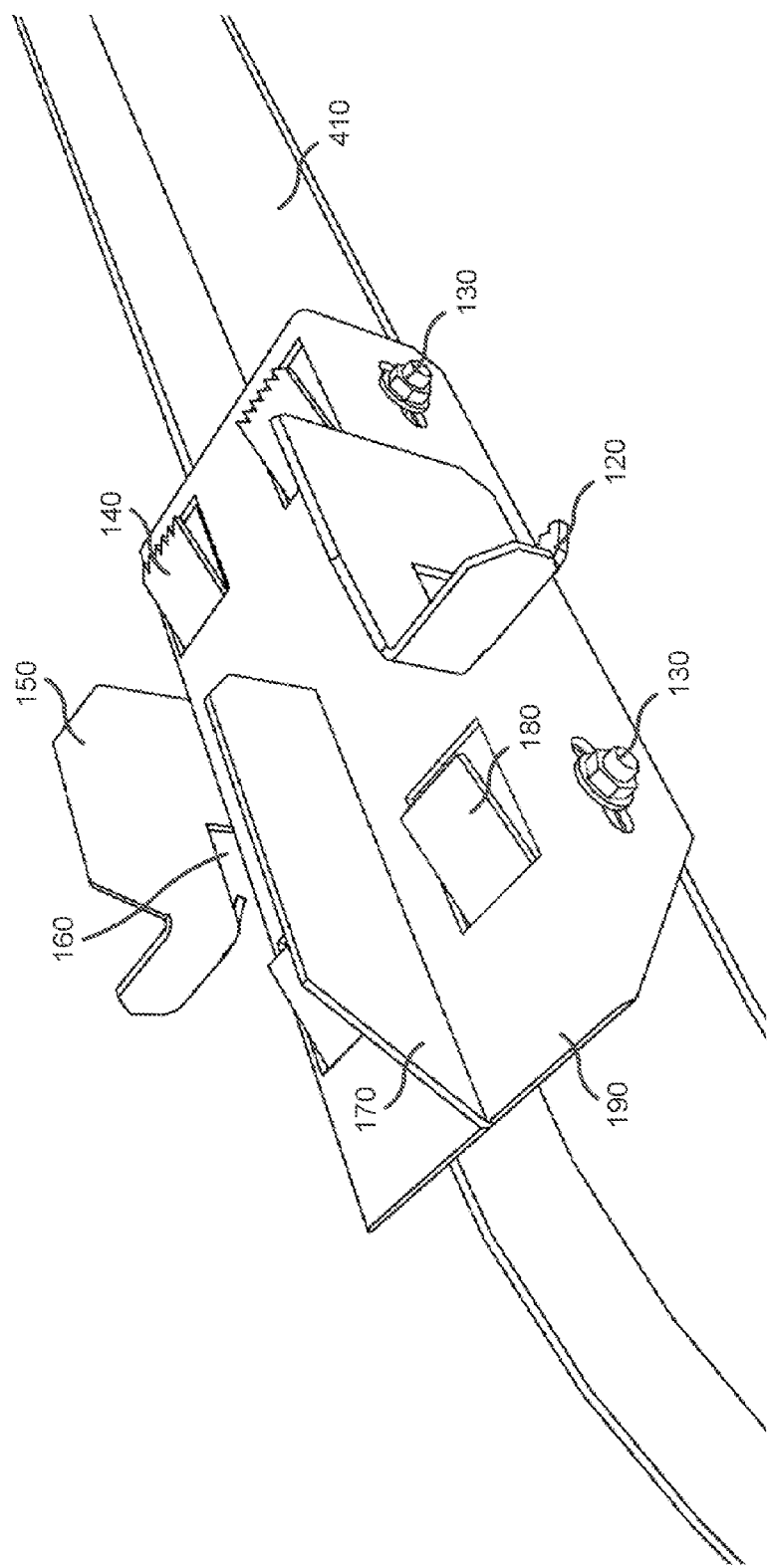
FIG. 4 provides a detail view of the first mounting clip removably bonded to the beam.

FIG. 4 shows a detail view of the first mounting clip removably bonded to the beam. A set of bolts 130 are used to bond the first mounting clip to the beam 410.

Figure 5:
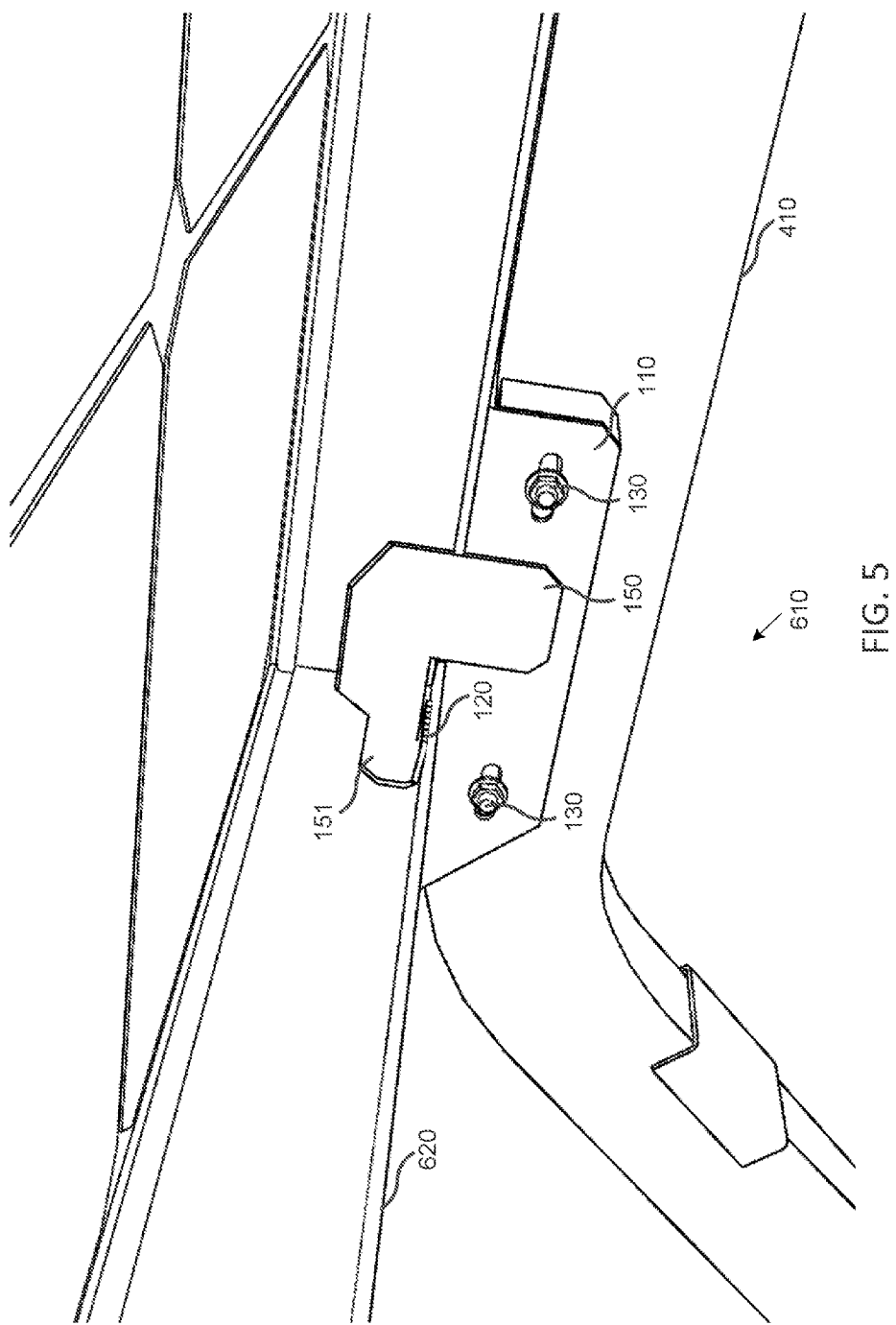
FIG. 5 provides a perspective view of a spring bonding tab at a bonding position.
Figure 6:
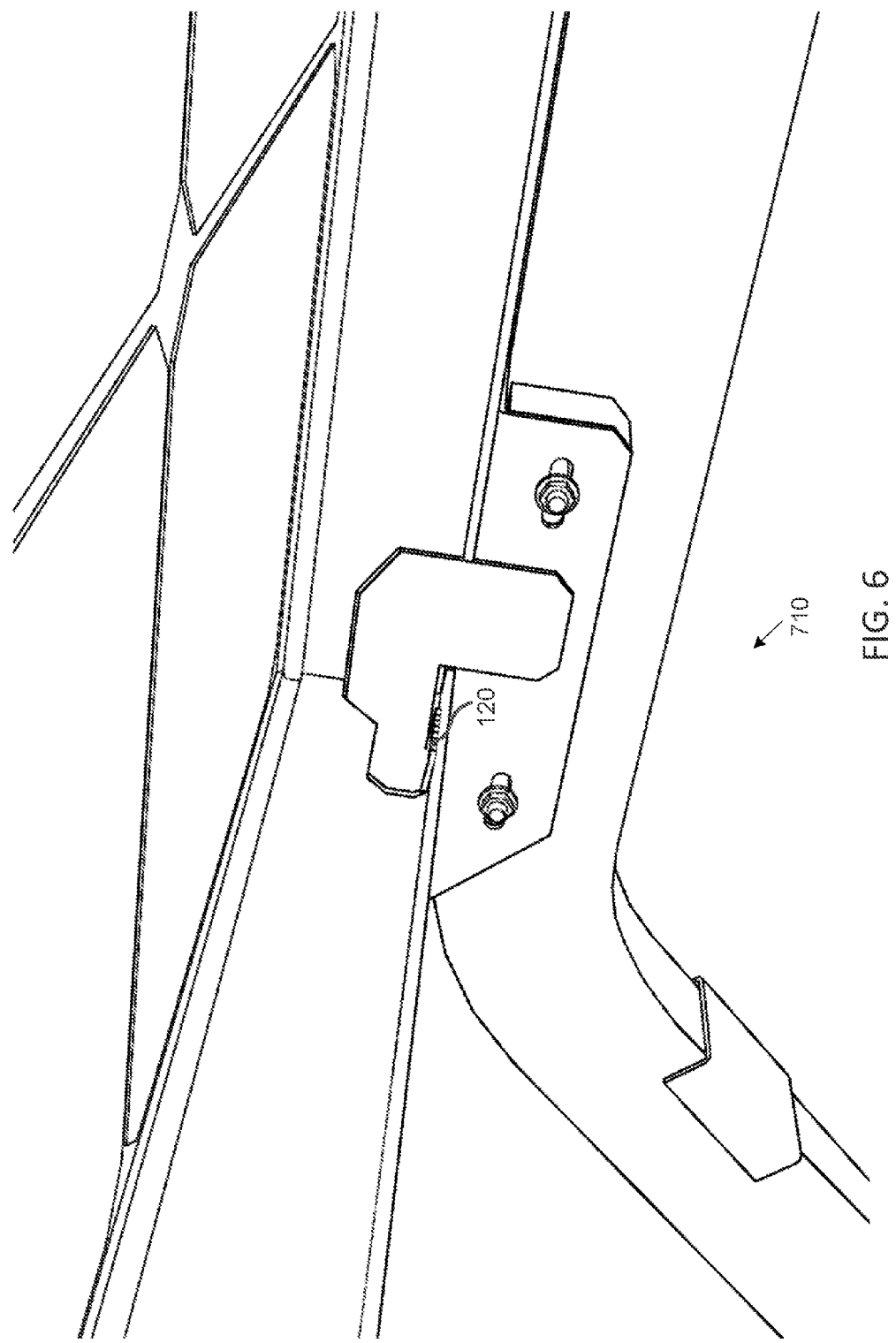
FIG. 6 provides another perspective view of a spring bonding tab at a bonding position.

FIGS. 5 and 6 shows a spring bonding tab at a bonding position. In FIG. 5, the spring bonding tab 120 is yet to make contact with the one or more panels 620 at position 610. In FIG. 6, the one or more panel is further pushed against the vertical indexing tab 151, the vertical indexing tab 151 prevents movement of the one or more panel 620 along the direction of a length of the beam 410. When pushed, the spring bonding tab 120 is seen making contact with the one or more panel at position 710, electrically bonding at the toothed edge of the spring bonding tab 120. The spring bonding tab 120 is made of spring-like material to firmly make contact against the one or more panels.

Figure 7:
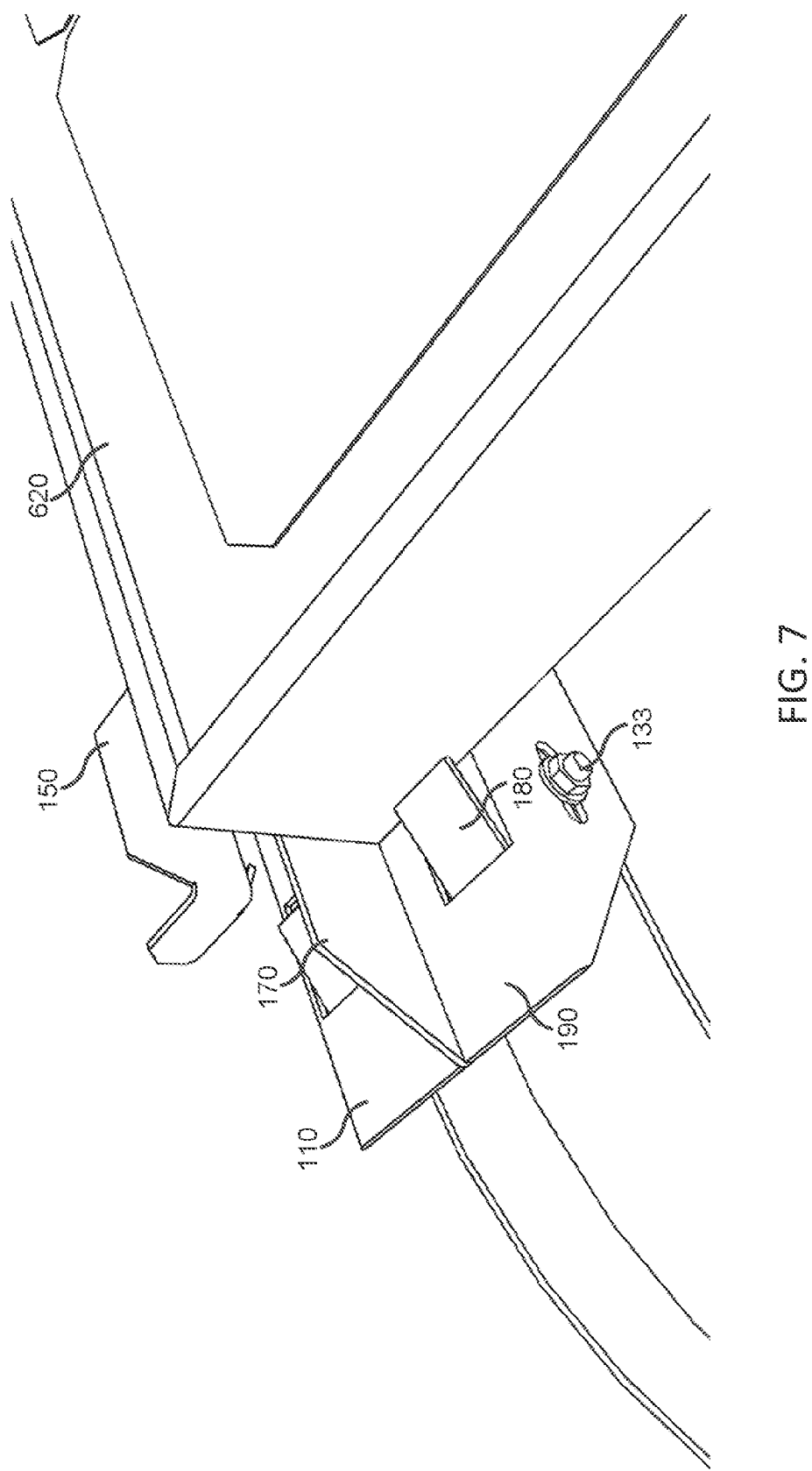
FIG. 7 provides an embodiment of one of the plurality of locking clips.

FIG. 7 shows an embodiment of one of the plurality of locking clips 180 retaining movement of the panel 620. The locking clip 180 is preventing movement of the panel 620 along a length of the beam. The central indexing tab 170 provides a guide to the panel 620 when slide against the locking clip 180.

Figure 8:
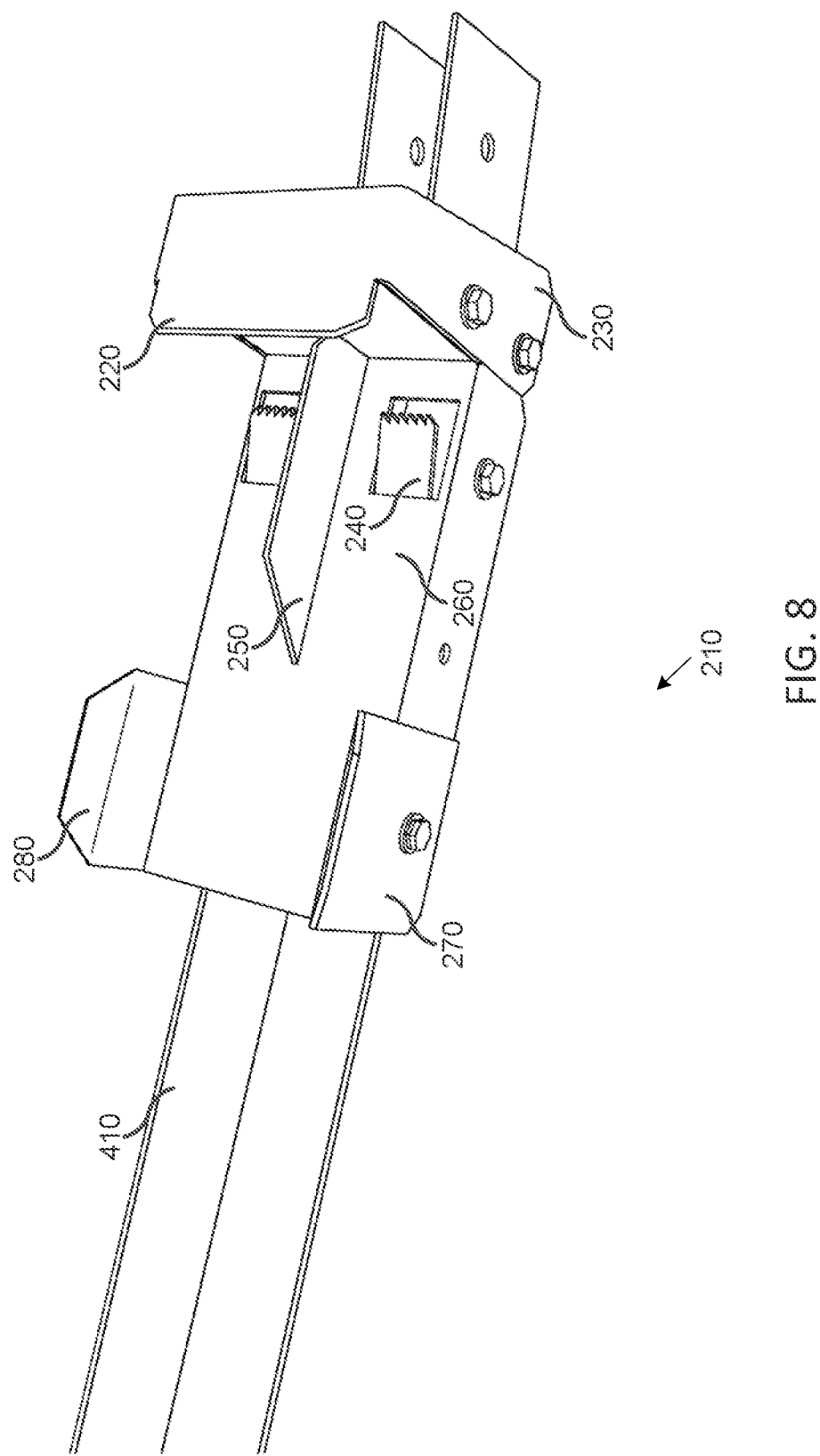
FIG. 8 provides an embodiment of the second mounting clip removably bonded.

FIG. 8 illustrates an embodiment of the second mounting clip removably bonded on top of the beam.

FIG. 9 shows a lengthwise cross section view 510 of the removably bonded second mounting clip of FIG. 8. The panel 620 is retained by the top flange 220 in z-direction, preventing detachment of the beam from the second mounting clip 210.

The bonding tabs 240 and indexing tabs 150 disclosed herein may be made of spring or the like flexible material accommodating any vibration of the photovoltaic panel that may occur due to wind or other causes.

Figure 10A:
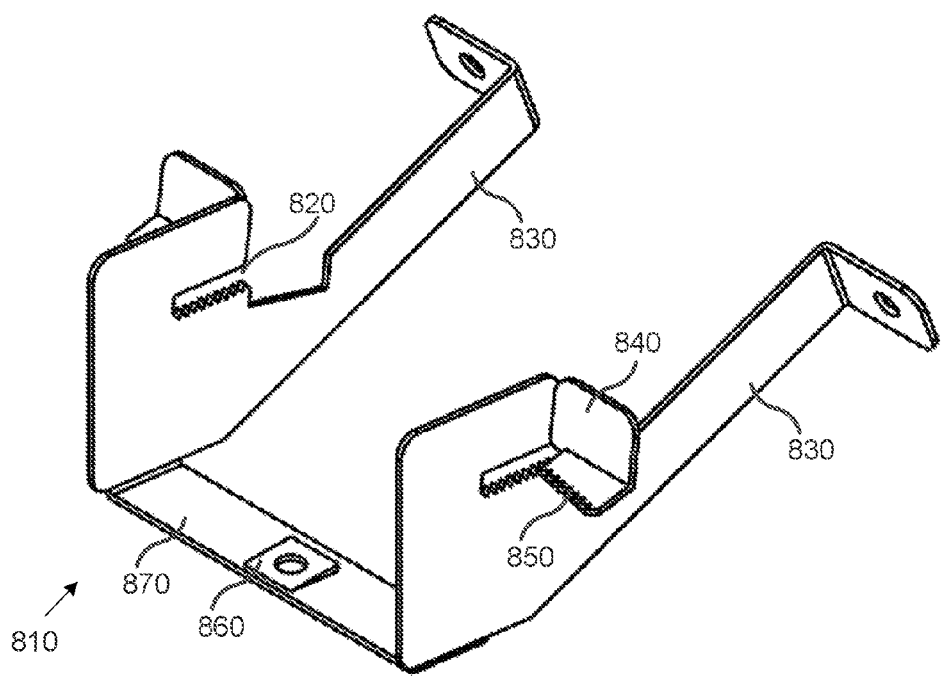
FIG. 10 (consisting of FIGS. 10A and 10B) provides an embodiment of a first lateral clip.
Figure 10B:
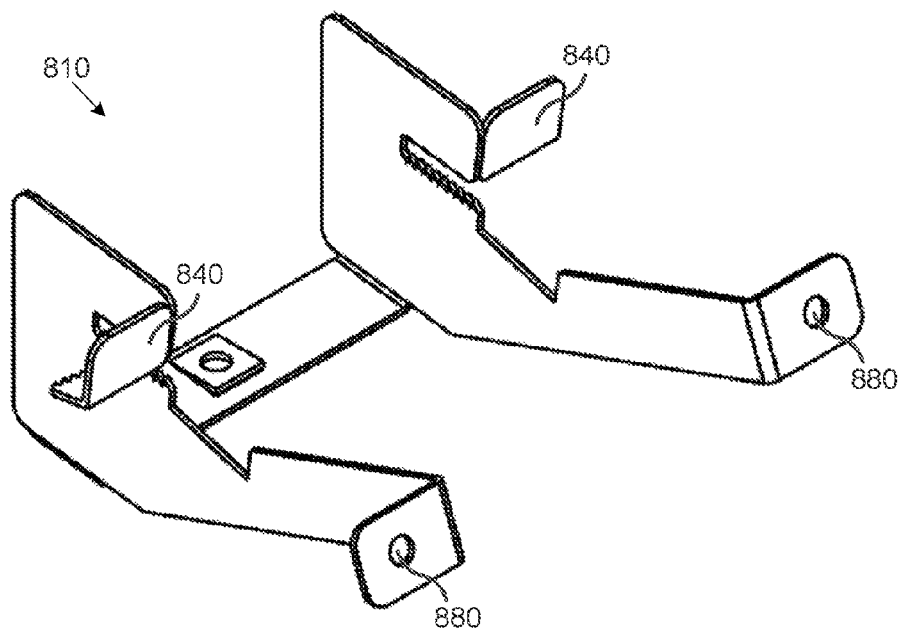

Now turning to FIG. 10 (consisting of FIGS. 10A and 10B), an embodiment of a first lateral clip is shown. The first lateral clip may removably attach one or more photovoltaic panel around a ballast. The first lateral clip may comprise a base 870, at least two flanges 830, a pair of slots 820, a pair of bearing tabs 840, and a pair of bonding teeth 850.

In one embodiment, the base 870 may have a width sized to fit at one end of the ballast.

In another embodiment, the at least two flanges 830 may be formed from the base 870 where each of the two flanges may further extend along a circumference of the ballast towards an opposite end of the ballast.

In a further embodiment, the pair of slots 820 may have an opening and formed near the one end of the ballast, each of the pair of slots 820 may be sized to receive one of the one or more photovoltaic panels. A part of each of the pair of slots 820 may form a toothed edge, the toothed edge may be configured to make contact with the one or more photovoltaic panels when attached.

In yet another embodiment, the pair of bearing tabs 840 may be formed contiguously from each of the two flanges 830. Each of the pair of bearing tabs 840 may be formed above the slot and extending outwardly away from the ballast.

The ballast contemplated herein may have a slope and made of material which may include, but not limited to, metals such as steel, stainless steel, aluminum, titanium, and the like; ceramic composites, composite reinforced metals, plastic and the like; and concrete, sand, and the like.

In a further embodiment, the pair of bonding teeth 850 may be formed at a lower edge of each of the pair of bearing tabs 840. The pair of bonding teeth 850 may further extend towards the base 870 where each of the pair of bonding teeth 850 may contact the one or more photovoltaic panels when attached.

In yet another embodiment, the at least two flanges 830 may further extend to wrap around the ballast providing a secure mounting of the first lateral clip to the ballast.

Figure 11:
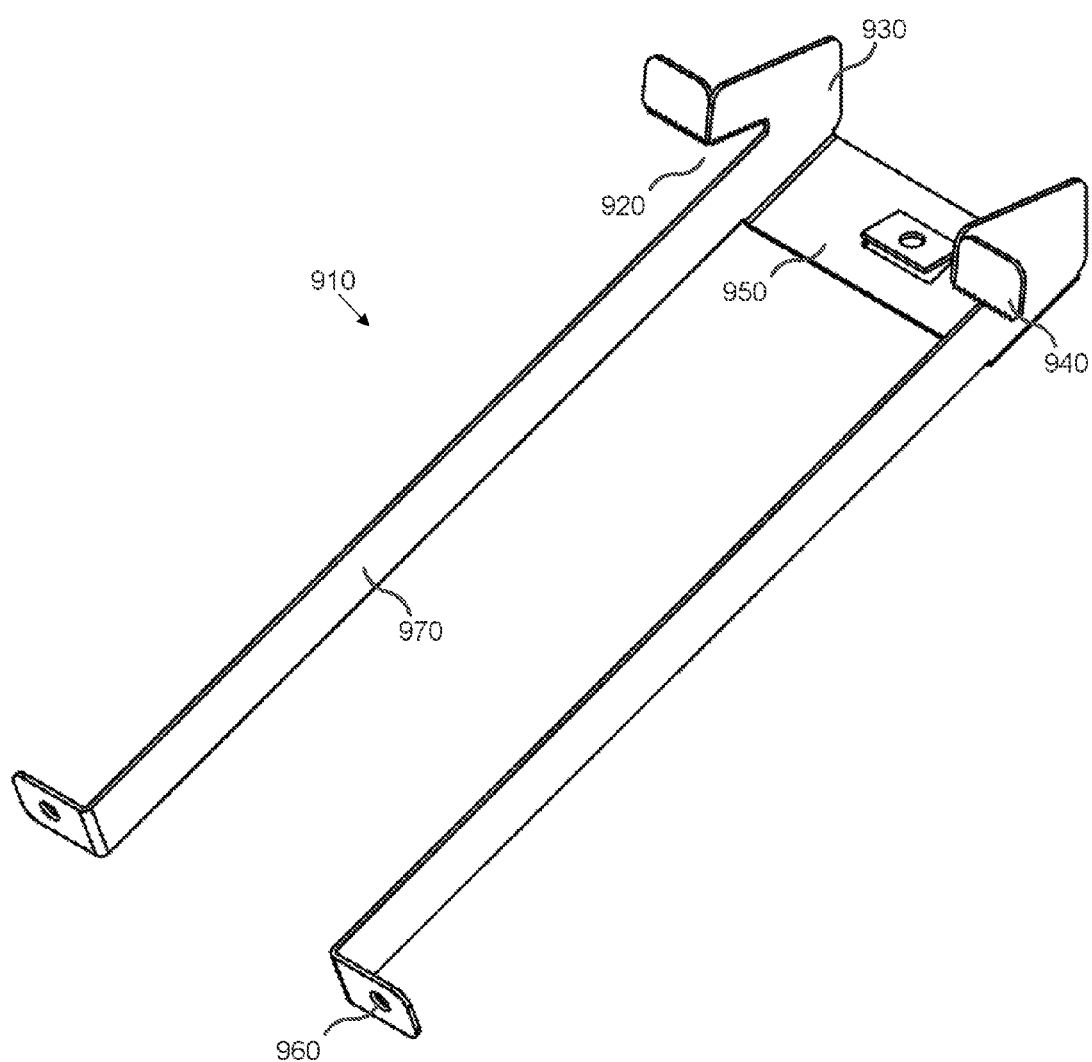
FIG. 11 provides an embodiment of a second lateral clip.

FIG. 11 shows an embodiment of a second lateral clip. The second lateral clip may attach one or more photovoltaic panels around a ballast. The second lateral clip may comprise a second base 950, at least two flanges 970, a pair of second slots 920, and a pair of second bearing tabs 940.

In one embodiment, the second base 950 may be constructed to have a second width where the second width may be sized to fit at one end of the ballast.

In another embodiment, the at least two flanges 970 may be formed from the second base and each of the two flanges 970 may extend along a circumference of the ballast towards an opposite end of the ballast.

In yet another embodiment, the two flanges 970 may mechanically fastened to the two flanges 830 of the first lateral clip hugging the ballast lengthwise.

In a further embodiment, the pair of second slots 920 may have an opening formed near the one end of the ballast. Each of the pair of second slots 920 may be configured to receive one of the one or more photovoltaic panels. A part of each of the pair of second slots 920 may have a toothed edge where the toothed edge may be configured to make contact with the one or more photovoltaic panels when attached.

In still another embodiment, the pair of second bearing tabs 940 may be formed contiguously from each of the two second flanges 970. Each of the pair of second bearing tabs 940 may be formed above the slot 920 and extending outwardly away from the ballast.

FIG. 12 shows an embodiment of the first lateral clip and the second lateral clip bonded to the ballast 1050. The schematic views of the one or more photovoltaic panels 1000, 1010 are presented. The first clip is attached at a lower end of the ballast face while the second clip is attached at a higher end of the ballast. The two clips are mechanically bonded at 1040 by a fastener. One of the pair of slots 820 are wedged against the one of the photovoltaic panel. One of the pair of bearing tabs and one of the pair of bonding teeth are preventing movement of mounted photovoltaic panel.

FIG. 13 illustrates an embodiment of the first lateral clip and the second lateral clip mechanically fastened together and mounted to the ballast.

FIG. 14 shows another embodiment of the first lateral clip mounting one of the photovoltaic panels to the ballast. One of the pair of bearing tabs 840 and one of the pair of slots 820 prevents movement of the mounted photovoltaic panel in any directions. The base 870 is wedged against the ballast 1130 providing secure mounting of the photovoltaic panel.

The bearing tabs 840 and second bearing tabs 940 disclosed herein may be made of spring or the like flexible material accommodating any vibration of the photovoltaic panel that may occur due to wind or other causes.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A first mounting clip for removably attaching one or more panels to a rail, constructed of a sheet of material, comprising:
   a base having a leading edge and a trailing edge, wherein a plurality of locking clips are formed within a plane of the base, each of the plurality of locking clips extending upwardly away from the base towards the leading edge, each of the plurality of locking clips providing upward force with regards to the base when pushed downwardly towards the base;
   a central indexing tab formed from the base uprightly, dividing the base in half lengthwise;
   at least two flanges formed at each side of the base and angled downwardly away from the base;
   a pair of lateral indexing tabs formed uprightly along the each side of the base, each of the pair of lateral indexing tabs further comprising a sliding slot defined between each of the pair of lateral indexing tabs and the base, the sliding slot having an opening end at the trailing edge; and
   a vertical indexing tab formed at each end of the pair of lateral indexing tabs, extending outwardly with respect to each of the lateral indexing tab at a perpendicular angle, the vertical indexing tab further extending downwardly towards the base and inwardly towards the leading edge at an angle, forming a spring bonding tab, wherein the spring bonding tab forms a toothed edge.

2. The first mounting clip of claim 1, wherein one or more of the plurality of locking clips have a toothed edge.

3. The first mounting clip of claim 1 further comprising a space defined between the lateral indexing tab and one of the plurality of locking clips formed near the trailing edge.

4. The first mounting clip of claim 1, wherein the first mounting clip is made of conductive material.

\* \* \* \* \*